US006850020B1

(12) United States Patent
Midas et al.

(10) Patent No.: US 6,850,020 B1
(45) Date of Patent: Feb. 1, 2005

(54) MULTIZONE CLAMPING SYSTEM FOR PAINT MIXER

(75) Inventors: Thomas J. Midas, Oak Park Heights, MN (US); Daniel Schulz, St. Michael, MN (US)

(73) Assignee: Red Devil Equipment Company, Plymouth, MN (US)

( * ) Notice: Subject to any disclaimer, the term of this patent is extended or adjusted under 35 U.S.C. 154(b) by 0 days.

(21) Appl. No.: 10/672,001

(22) Filed: Sep. 26, 2003

(51) Int. Cl.[7] .................................................. H02P 3/00

(52) U.S. Cl. ....................... 318/386; 318/466; 318/470; 318/468; 366/118; 366/141; 366/209; 366/218; 366/605

(58) Field of Search ................................ 318/286, 466, 318/470, 468; 366/118, 141, 209, 218, 605

(56) References Cited

U.S. PATENT DOCUMENTS

| | | | | |
|---|---|---|---|---|
| 835,846 A | | 11/1906 | Blalock | |
| 1,448,446 A | | 3/1923 | Hulbert | |
| 1,463,626 A | | 7/1923 | Marrazzo | |
| 1,755,763 A | | 4/1930 | Barber | |
| 2,797,902 A | | 7/1957 | Beugler | 259/72 |
| 2,894,309 A | | 7/1959 | Brzowski | 24/263 |
| 3,018,092 A | | 1/1962 | Johnson | 259/54 |
| 3,229,964 A | | 1/1966 | Wiseman | 259/57 |
| 3,284,057 A | | 11/1966 | Duquette | 259/88 |
| 3,421,053 A | | 1/1969 | Rinard et al. | 317/157.5 |
| 3,542,344 A | | 11/1970 | Oberhauser | 259/75 |
| 3,609,921 A | | 10/1971 | Foster et al. | 51/164 |
| 3,735,962 A | | 5/1973 | Pagano | 259/72 |
| 3,880,408 A | | 4/1975 | Karjalainen | 259/72 |
| 4,134,689 A | * | 1/1979 | Ahrenskou-Sorensen | 366/110 |
| D254,973 S | | 5/1980 | Ahrenskou-Sorensen | |
| 4,235,553 A | | 11/1980 | Gall | 366/208 |
| 4,281,936 A | | 8/1981 | Schotter et al. | 366/209 |
| 4,568,194 A | | 2/1986 | Gargioni | 366/123 |
| 4,588,302 A | | 5/1986 | Pizzi et al. | 366/349 |
| 4,789,245 A | | 12/1988 | Morbeck | 366/217 |
| 4,842,415 A | | 6/1989 | Cane et al. | 366/110 |
| 5,066,136 A | * | 11/1991 | Johnson | 366/209 |
| 5,094,541 A | | 3/1992 | Nelson | 366/185 |
| 5,268,620 A | * | 12/1993 | Hellenberg | 318/114 |
| 5,458,416 A | * | 10/1995 | Edwards et al. | 366/209 |
| 5,662,416 A | * | 9/1997 | Dwigans, II | 366/209 |
| 6,538,428 B1 | * | 3/2003 | Sohn | 324/207.16 |
| 2004/0013031 A1 | * | 1/2004 | Salas et al. | 366/141 |

* cited by examiner

*Primary Examiner*—Rita Leykin
(74) *Attorney, Agent, or Firm*—Faegre & Benson LLP

(57) ABSTRACT

Apparatus and method for automatically determining which of at least two forces to apply to a paint container in a mixing apparatus that is capable of clamping various sized paint containers. A clamp motor drives a clamping apparatus toward a paint container and a current rise signals engagement of the clamp with the container, whereupon a selection is made from a predetermined set of forces to apply to the container based on the time of energization and voltage applied to the clamp motor.

22 Claims, 16 Drawing Sheets

MULTIZONE CLAMPING SYSTEM FOR PAINT MIXER

FIELD OF THE INVENTION

This invention relates to the field of paint mixers of the type suitable for mixing paint in containers of various sizes.

BACKGROUND OF THE INVENTION

In the past, paint mixers have been used to mix paint in containers of various sizes. Such prior art mixers have required manual adjustment of a clamping mechanism to properly secure the specific containers being agitated, without crushing or otherwise damaging the containers. Low clamping pressure could result in inadvertent release of the containers, possibly causing damage to the containers and the mixer, and excessive clamping pressure could result in damage or even destruction of the paint containers, with either improper condition potentially resulting in a paint spill at least requiring cleanup and possibly resulting in damage to the mixer and its environment.

The present invention overcomes the shortcomings of the prior art by providing a clamping system that automatically determines and provides a clamping pressure appropriate for the size of paint container placed in the mixer, without requiring a decision or selection by a human operator of the paint mixer.

DETAILED DESCRIPTION OF THE INVENTION

Figure 1:
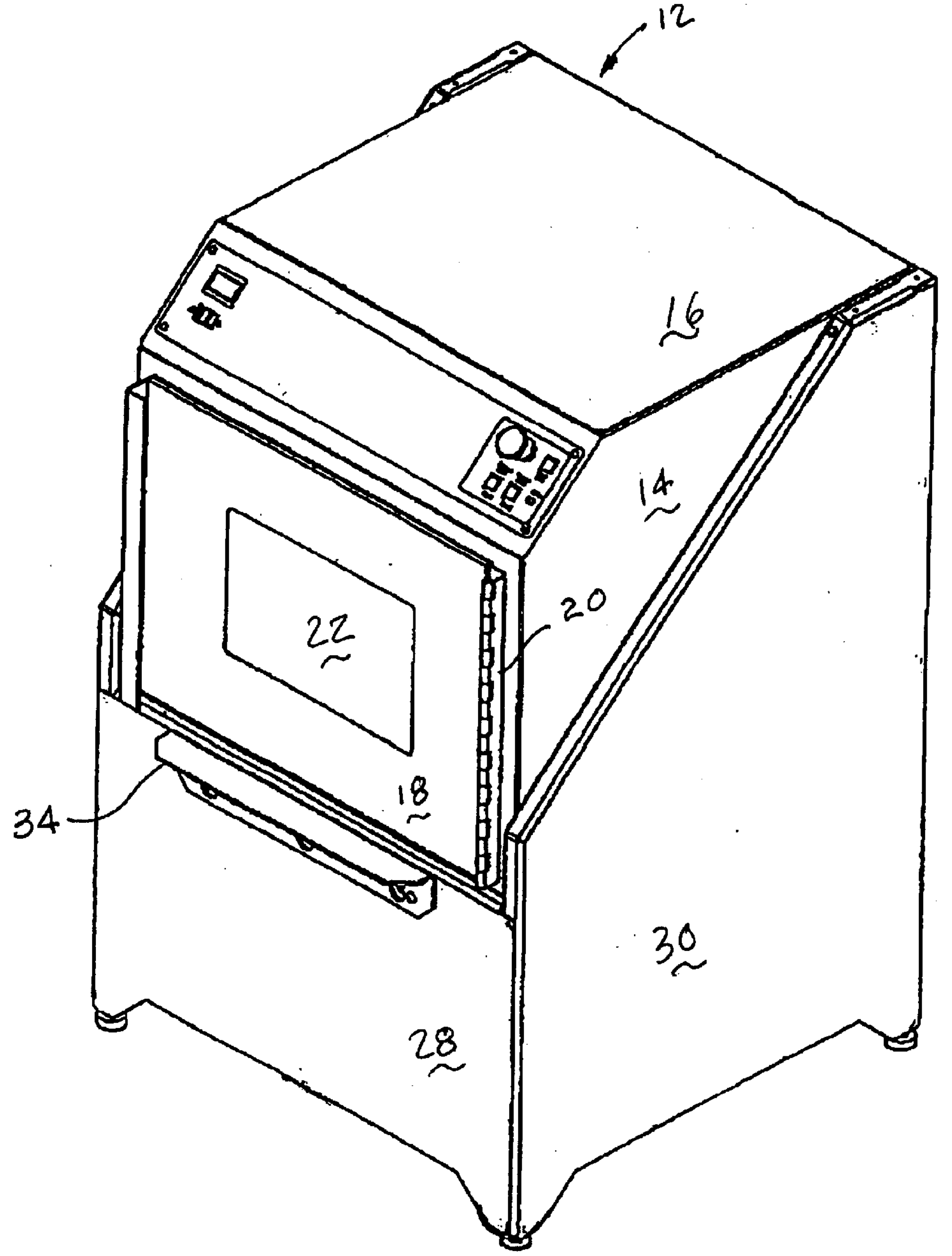
FIG. 1 is a perspective view of a paint mixer useful in the practice of the present invention.
Figure 2:
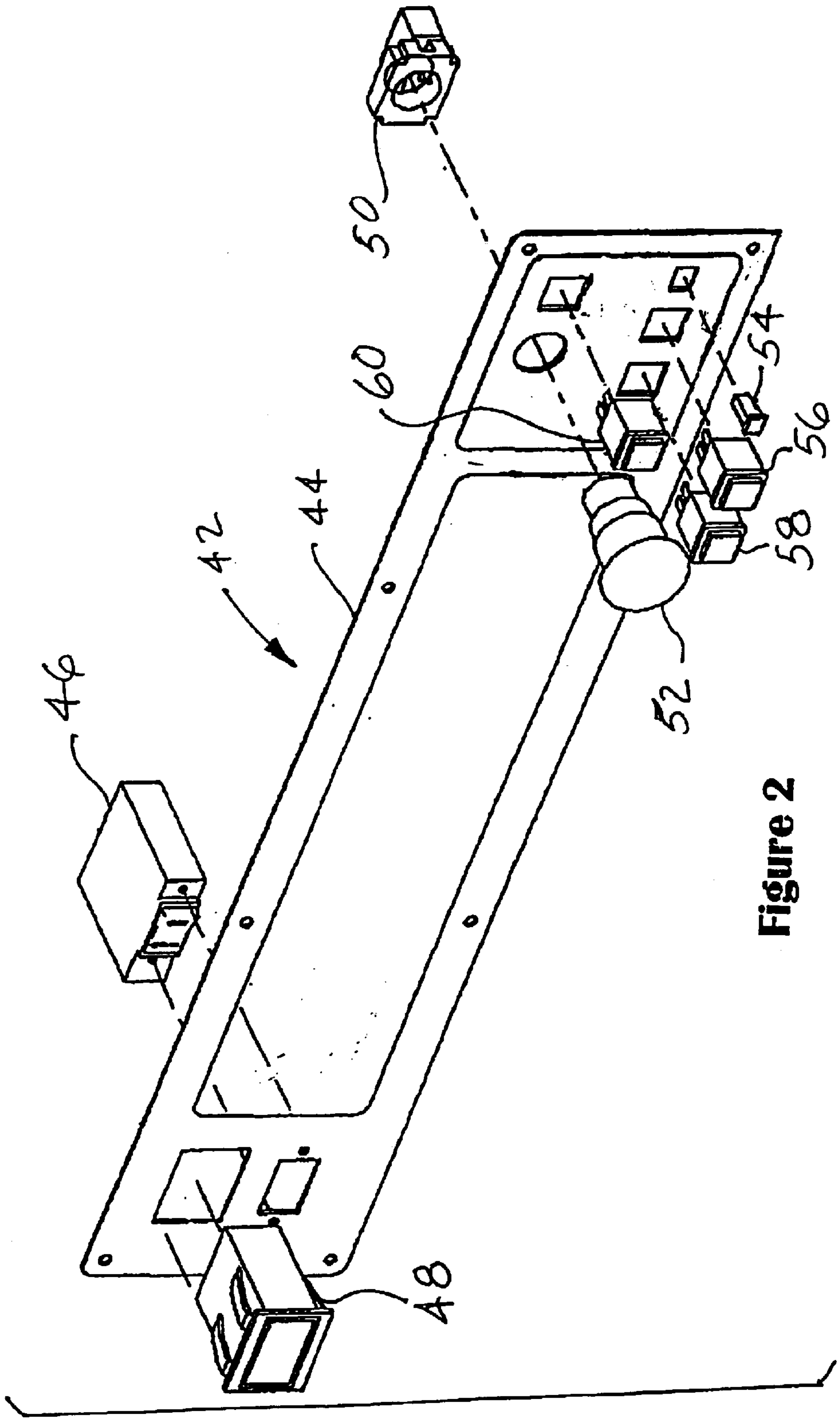
FIG. 2 is an exploded perspective view of a control panel and components of the paint mixer of FIG. 1.
Figure 3:
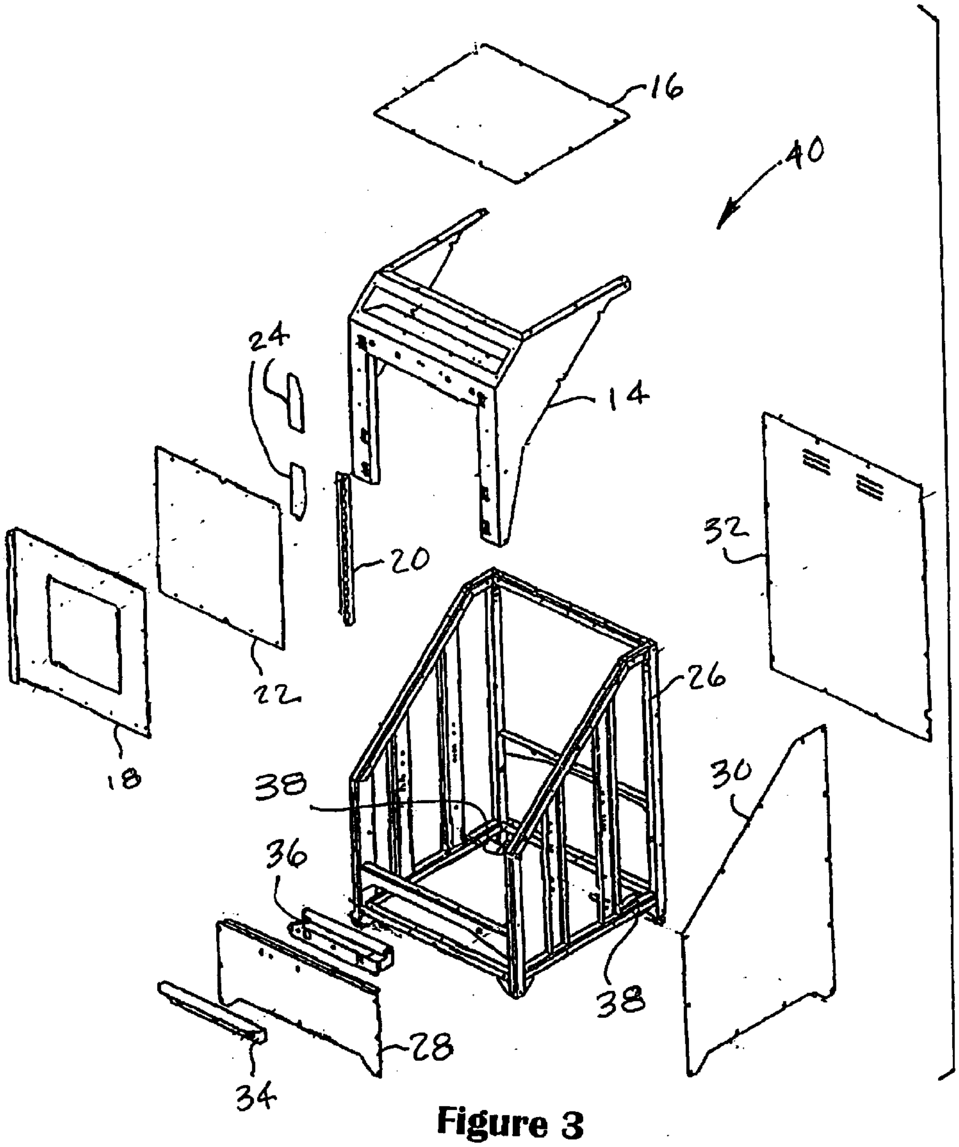
FIG. 3 is an exploded view of an exterior frame and enclosure of the paint mixer of FIG. 1.

Referring now to the Figures, and most particularly to FIGS. 1, 2, and 3, a paint mixer 12, is available as a model 5990 from Red Devil Equipment Company of 14900 21$^{st}$ Avenue North, Plymouth, Minn. 55447. Paint mixer 12 is one mixer suitable for the practice of the present invention it that it can hold various sizes of paint containers for mixing. Another model of mixer or automatic platform shaker suitable for use with the present invention includes a model 5900 from the same source. Each of these mixers is capable of holding the following loads: 1 to 9 pints, 1 to 9 quarts, 1 to 4 conventional cylindrical gallon containers (each with or without a cardboard case), or 1 to 4 square gallon containers (with adapter). In addition, the model 5990 can hold 1 five gallon container, or one 3.5 gallon container, or other containers having a height in the range of 4" to 17.5".

Paint mixer 12 has a door mount 14 and a door mount cover 16. A door 18 is secured to door mount 14 by a hinge 20. A transparent window 22 secured to door 18 allows visual inspection of the interior of mixer 12 with the door closed. Referring now most particularly to FIG. 3, a pair of strike plates 24 for door 18 are secured to door mount 14. Door mount 14 is attached to an external frame 26 which is covered by a front panel 28, a pair of side panels 30 (only one of which is shown) and a back panel 32. A front panel shelf 34 is attached to the exterior of front panel 28 and a roller assembly 36 is attached to the interior of front panel 28. A pair of conical isolators 38 are mounted in external frame 26 to act as a stop for the middle frame assembly 40, shown in more detail in FIG. 4.

Referring now most particularly to FIGS. 1 and 2, a control panel subassembly 42 is provided on mixer 12. Subassembly 42 includes a control panel 44 in which is mounted a power switch and circuit breaker 46, a cycle counter 48, an emergency stop switch 50 and palm button actuator 52, an indicator lamp 54, and three pushbuttons 56, 58 and 60. When continuously illuminated, indicator lamp 54 indicates a MIXING ON condition; lamp 54 will flash when a mixing cycle is terminated by a power interruption. Pushbutton 56 activates a "SHORT CYCLE" while pushbutton 58 activates a "LONG CYCLE" each of which are for the main drive causing paint mixing, and pushbutton 60 activates an "UP" cycle for the clamping mechanism to release paint containers from the clamping mechanism in the practice of the present invention, all as described in more detail, infra.

Figure 4:
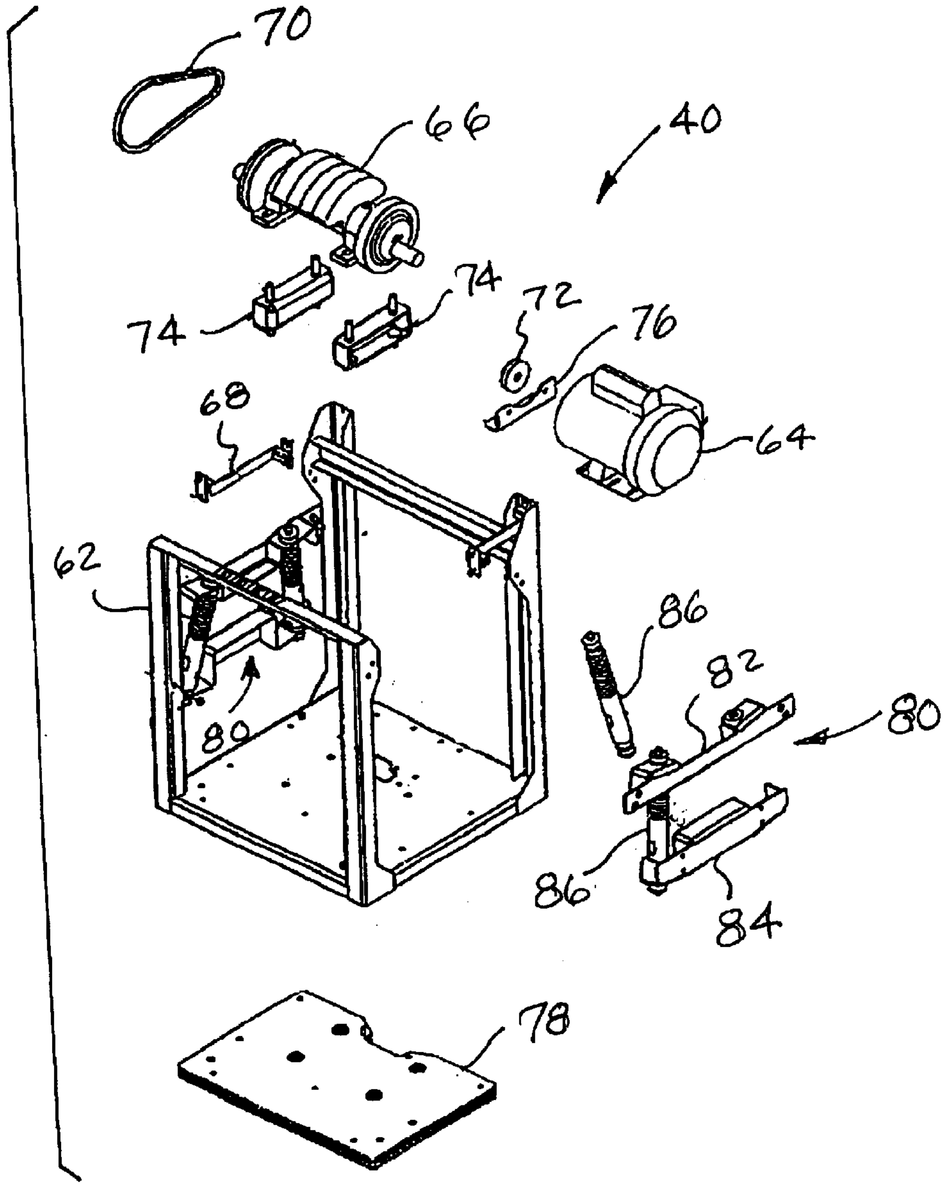
FIG. 4 is an exploded view of a middle frame and main drive useful in the practice of the present invention in connection with the paint mixer of FIG. 1.

Referring now to FIG. 4, the middle frame and main drive subassembly 40 includes a middle frame 62 driven by a mixer motor 64 and counterweight assembly 66. Subassembly 40 also includes a pair of follower arm assemblies 68. Each follower arm subassembly 68 connects the middle frame 62 to a clamp frame assembly 88, shown in FIG. 5. A cog-type V-belt 70 connects a motor pulley 72 to the counterweight assembly 66. The counterweight assembly 66 is supported by a pair of pillow block mounts 74, and motor 64 is reinforced by a motor stiffener 76. A stacked plate weight 78 is secured to the middle frame 62, and a pair of strut mounting assemblies 80 support middle frame and main drive subassembly 40 in external frame 26. Each of the assemblies 80 includes an upper strut mount 82 and a lower strut mount 84 connected together with a pair of strut assemblies 86. Upper strut mounts 82 are each secured to middle frame 62; while lower strut mounts are each secured to external frame 26.

Figure 5:
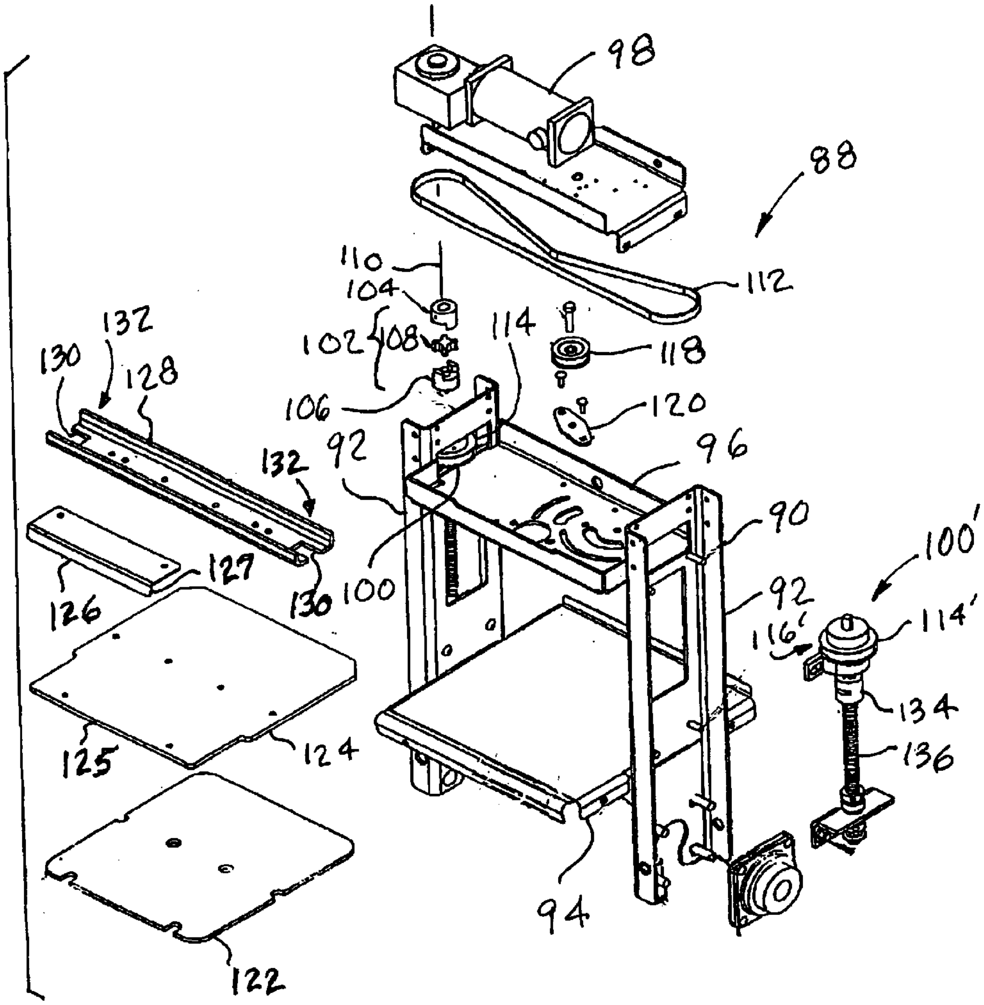
FIG. 5 is a clamp frame assembly useful in the practice of the present invention in connection with the paint mixer of FIG. 1.

Referring now to FIG. 5, the clamp frame assembly 88 may be seen. Assembly 88 includes a clamp frame 90 which includes a pair of vertical risers 92 connecting a bottom plate 94 to an upper cross plate 96. It is to be understood that risers 92 and plates 94 and 96 are rigidly secured together to form clamp frame 90.

Assembly 88 also includes a DC gear motor 98 serving as a clamp motor 98 for the clamp frame assembly 88. Motor 98 drives a first lead screw assembly 100 via a flexible coupling 102 made up of first and second coupling halves 104, 106 connected by an elastomer spider 108 along an axis 110. Lead screw assembly 100 has a timing gear pulley 114 driving a timing belt 112. Belt 112 is also connected to a drive pulley 114' on a first end 116' of a second lead screw assembly 100.' An idler pulley 118 mounted on a tensioner base 120 pivotably secured to upper cross plate 96 may be adjusted to maintain tension on timing belt 112.

A top pad 122 is secured to a top plate 124. A top plate angle 126 is secured to top plate 124 at an edge 125 thereof to provide a depending lip 127 extending therefrom. A top plate crossmember 128 is secured to the top plate 124, and has a slot 130 in each end 132 of crossmember 128 for respective engagement with each of a pair of lead screw nut 134, mounted in respective lead screw assemblies 100, 100'. It is to be understood that motor 98 is a clamp motor operative to move lead screw nuts 134 along their respective lead screws 136, thus moving top plate 124 up or down, while maintaining parallelism between top plate 124 and bottom plate 94.

Figure 6:
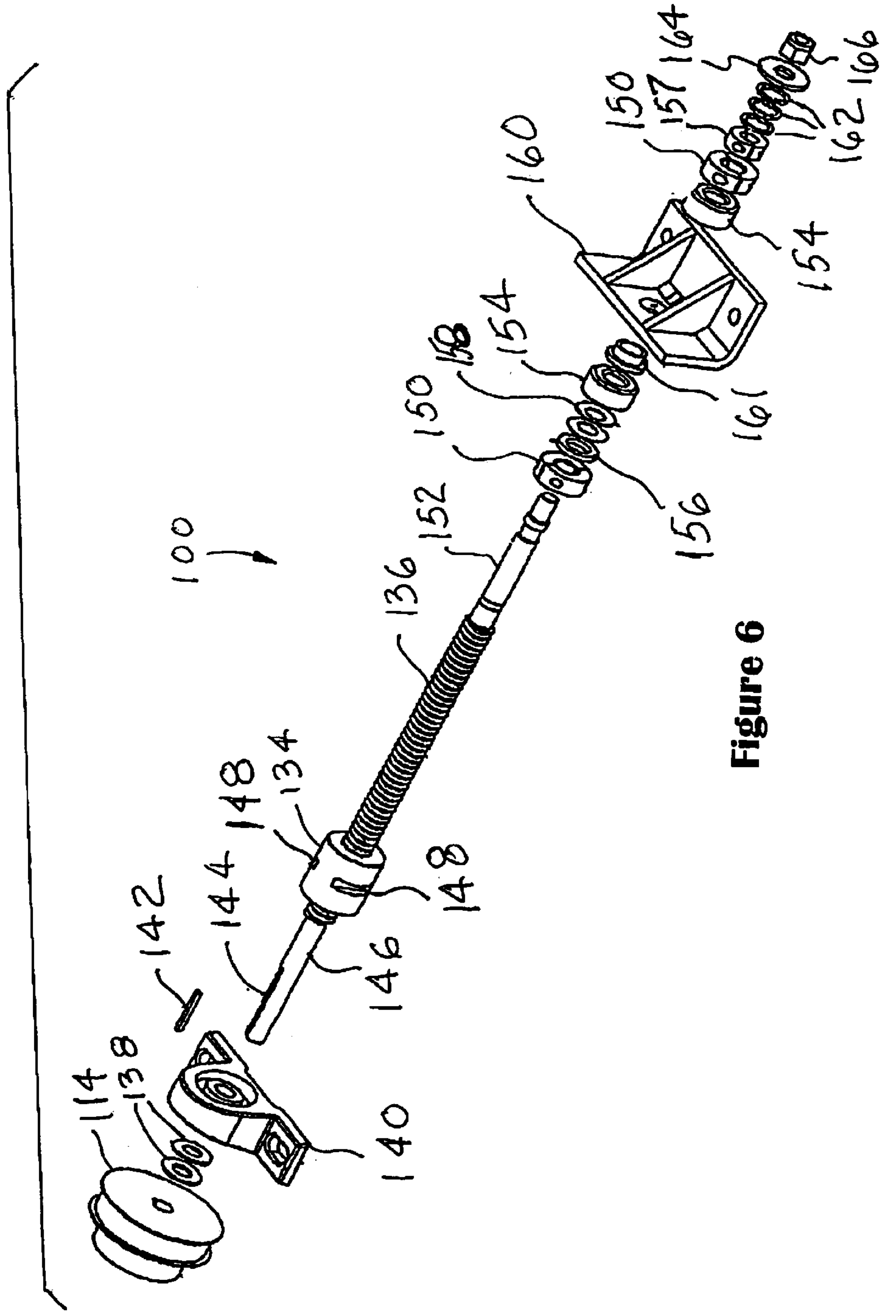
FIG. 6 is an exploded view of a lead screw assembly from FIG. 5.

Referring now also to FIG. 6, an exploded view of a lead screw assembly 100 may be seen. It is to be understood that assembly 100 and 100' are preferably identical, except that assembly 100 is driven through flexible coupling 102. In addition to timing gear pulley 114, lead screw nut 134 and lead screw 136, assembly 100 has a pair of polytetrafluroethylene washers 138, a pillow block bearing 140, a key 142 (to secure pulley to a keyed end 144 of a first shaft extension 146 of lead screw 136. In the case of the embodiment in the 5990 model, to shorten machine height, a modified timing belt pulley is used to combine the lower half of the coupling with the pulley. It is to be understood that each of lead screw nuts 134 has a pair of flats 148 therein which engage slots 130 in the top plate crossmember 128. This engagement prevents nuts 134 from rotating with screw 136, and causes axial movement of nuts 134 along screw 136, when screw 136 is rotated.

Assembly 100 further includes a pair of shaft collars 150 secured to a second shaft extension 152. A pair of thrust bearings 154 are provided for assembly 100, along with a shim 156 and a disk spring 158. Bracket 160, together with a bronze bearing 161, provide a structure to mount the lead screw assembly 100 to an adjacent surface, it being understood that additional support is provided by the pillow block bearing 140. A plurality of nylon washers 162 and a flat washer 164 and lock nut 166 complete the assembly 100. A clamp collar 157 acts as a primary stop with the adjacent shaft collar 150 acting as a redundant stop.

Figure 7:
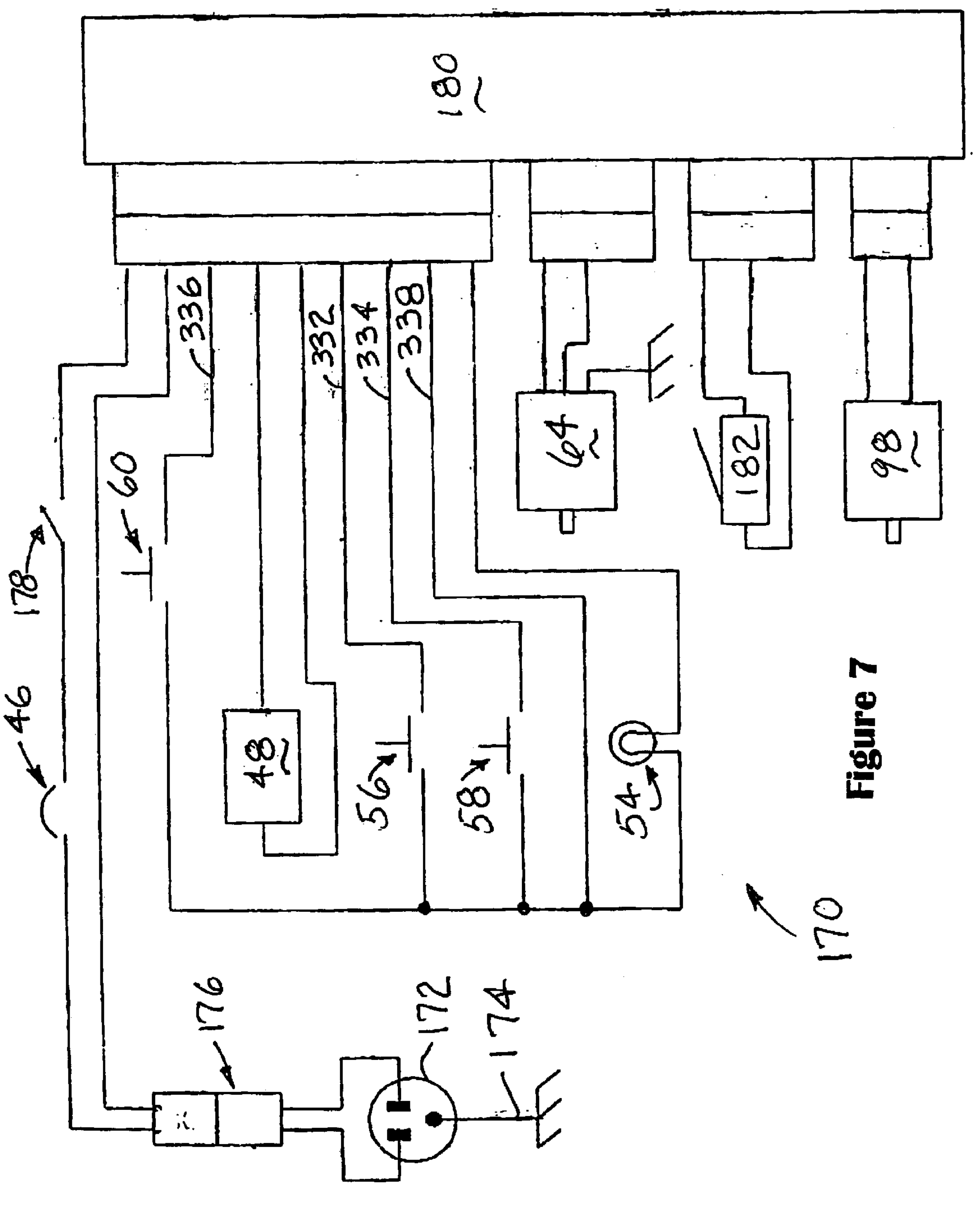
FIG. 7 is an electrical system wiring diagram for a control system of the present invention.

Referring now to FIG. 7, an electrical system wiring diagram 170 of the present invention may be seen. A conventional 115 VAC power cord is indicated by symbol 172. A ground connection 174 is provided, as is conventional. Power is supplied via a connector 176, the circuit breaker 46 (which also serves as an ON-OFF switch) and an emergency stop switch 178, operable by actuator 52. Circuit breaker and actuator 52 may be seen in FIG. 2. The UP switch 60 is connected to a controller 180, as are the cycle counter 48, the SHORT CYCLE switch 56, the LONG CYCLE switch 58, the indicator lamp 54, and the mixer motor 64, a limit switch 182, and the CLAMP motor 98. It is to be understood that limit switch 182 is an interlock switch for door 18.

Figure 8:
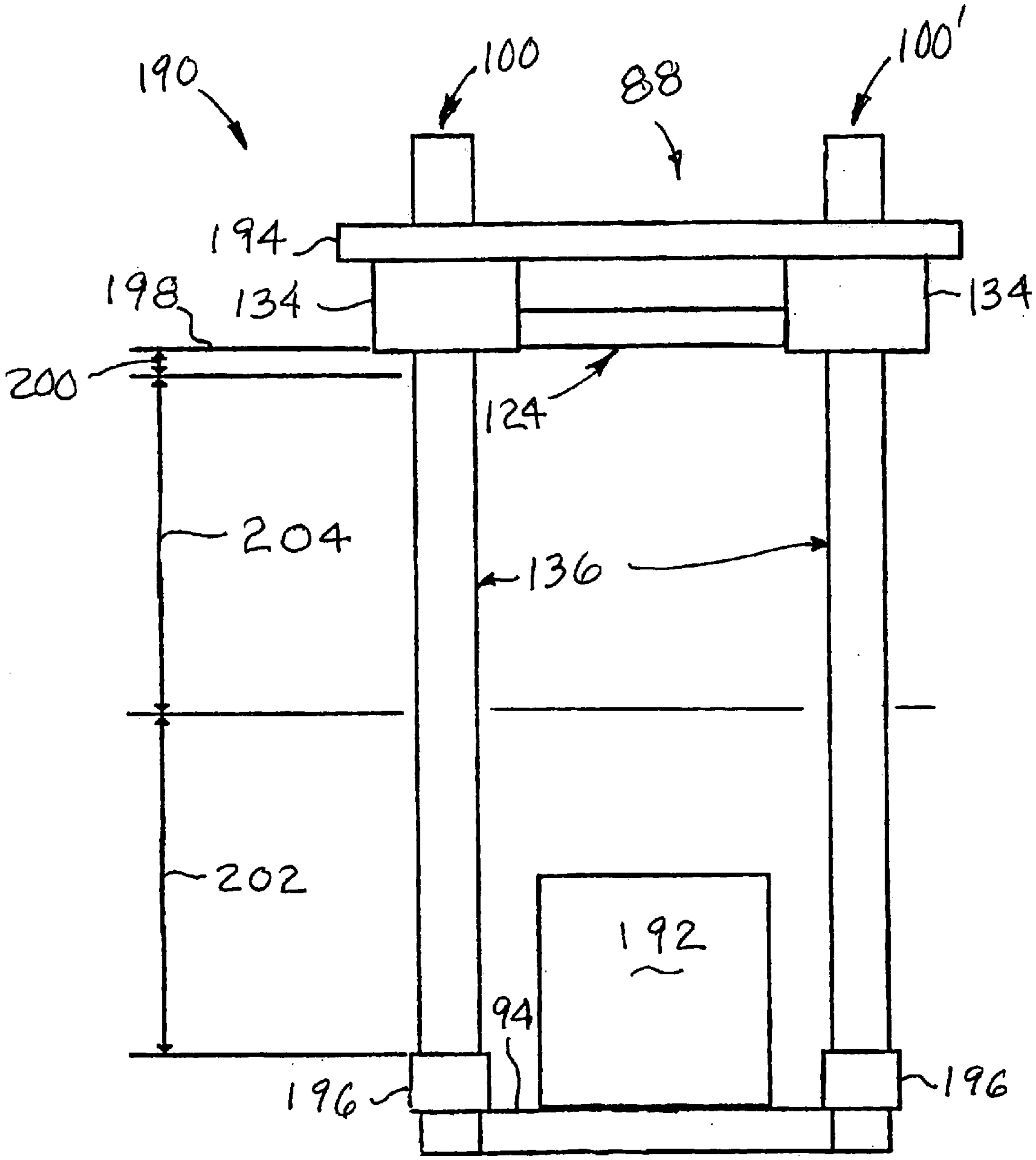
FIG. 8 is a simplified view of a clamping mechanism to show zone positions for one embodiment of the present invention.

Referring now to FIG. 8, a zone position diagram 190 for the present invention may be seen. Diagram 190 includes a simplified view of the clamping mechanism 88 to illustrate certain aspects of the present invention. A paint container 192 is shown resting on the bottom plate 94. A top stop 194 and a pair of bottom stops 196 are shown in simplified form. Top plate 124 is carried by lead screw nuts 134 along lead screws 136. Top plate 124 is shown in FIG. 8 in a START position, indicated by line 198. A PROOF-OF-MOVEMENT zone 200 preferably extends 0.75 inches from the START position. ZONE 1, indicated by double headed arrow 202, preferably extends 7.0 inches from the bottom stop 196, and ZONE 2, indicated by double headed arrow 204, preferably extends 6.6 inches between ZONE 1 (202) and the PROOF-OF-MOVEMENT zone 200.

Figure 9:
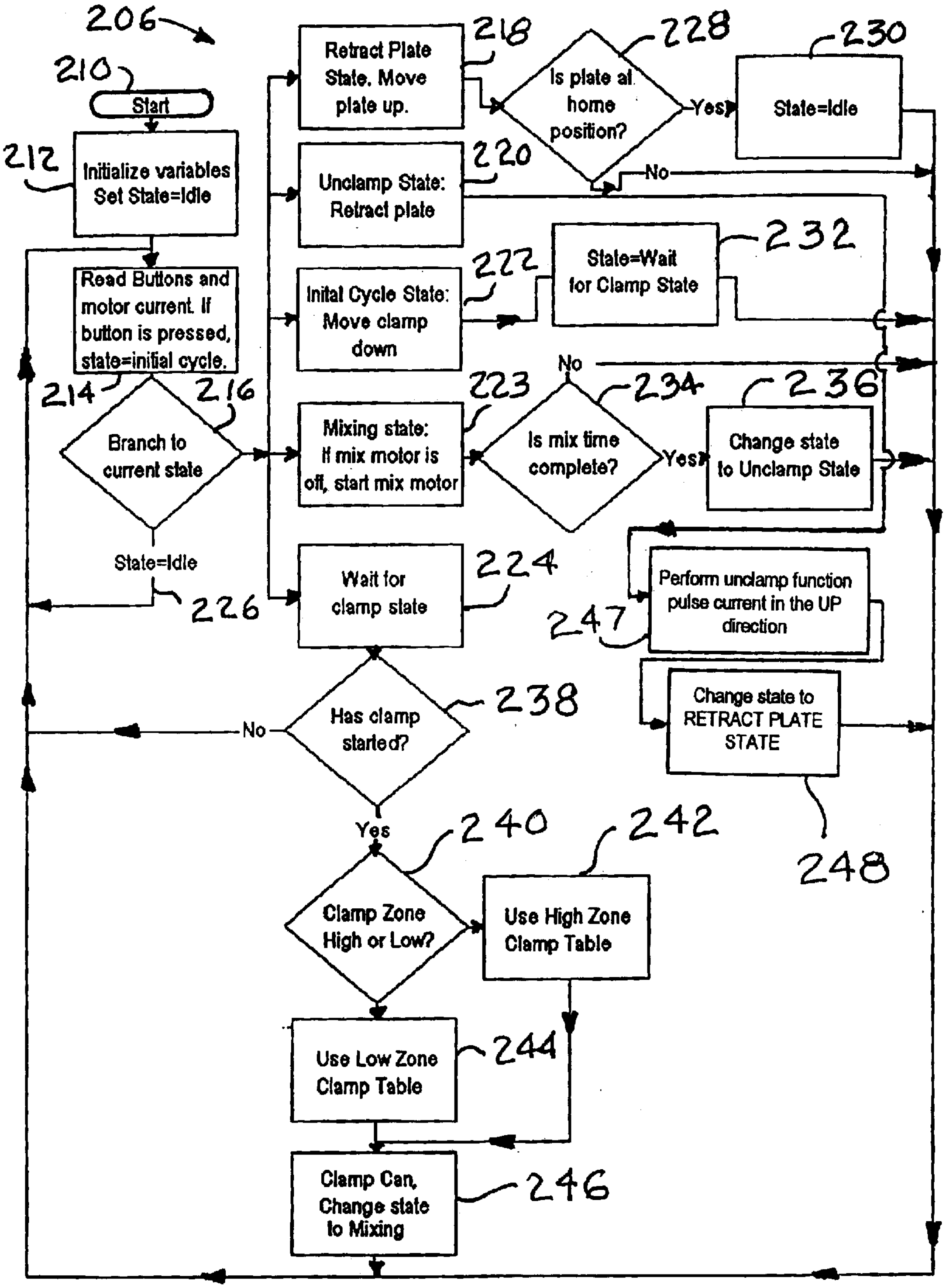
FIG. 9 is a flow chart illustrating the operation of the control system of the present invention.

Referring now to FIG. 9, a flow chart 206 illustrating the operation of the control system of the present invention may be seen. The process begins at a start block 210. In block 212, variables are initialized and the state is set to an IDLE condition. In block 214, the system reads the input buttons and clamp motor current., When a button is depressed, the state is set to an INITIAL CYCLE condition. Next, the system operation progresses to block 216 in which the current state of the system is determined, and branching occurs to one of a RETRACT PLATE state block 218, an UNCLAMP state block 220, an INITIAL CYCLE state block 222, a MIXING state block 223, a WAIT FOR CLAMP state block 224, or a return to block 214 via line 226. If the system is in any state other than IDLE, control branches to one of the five other states. In block 218, the top plate 124 is moved up. In block 228, the system tests to determine whether the top plate is in the home or START position 198. If so, the system state is returned to IDLE in block 230, and control passes to block 214. If not, the system remains in the RETRACT PLATE state while control is returned to block 214. If the system is in the UNCLAMP state, the top plate is retracted (raised) in block 247, followed by a state change in block 248 and control is returned to block 214. If the system is in the INITIAL CYCLE state, the top plate is moved down in block 222. The system is then placed in the WAIT FOR CLAMP state in block 232, and control is returned to block 214.

If the system is in the MIXING state and the mixer motor 64 is OFF, the mixer motor 64 is turned ON, and the mix time is tested in block 234. If the mix time is complete, control passes to block 236 in which the system is placed in the UNCLAMP state. Control is then passed to block 214. If the mix time is not complete, block 236 is bypassed and control is returned to block 214 with the system still in the MIXING state.

If the system is in the WAIT FOR CLAMP state as it leaves block 216, control is passed to block 224 and then the system is tested in block 238 to see if the clamping condition has occurred. If not, control is returned to block 214. If clamping has commenced, a test is performed in block 240 to determine whether the system is in a HIGH or LOW zone. If in the HIGH zone, control passes to block 242, where the system is directed to use a HIGH zone clamp table. If in the LOW zone, the system is directed to use a LOW zone clamp table in block 244. Once a clamp zone table is selected, control passes to block 246, the paint container is clamped, and the system is placed in the MIXING state. Control then passes to block 214. Tables 1 and 2 are, respectively, the LOW and HIGH zone clamping tables.

TABLE 1

| Selector Switch Setting | Clamping Current Set Point (amperes) | Force (lbs., REF) |
|---|---|---|
| 0 | 1.45 | 1000 |
| 1 | 1.59 | 1100 |
| 2 | 1.74 | 1200 |
| 3 | 1.88 | 1300 |
| 4 | 2.03 | 1400 |
| 5 | 2.17 | 1500 |
| 6 | 2.32 | 1600 |
| 7 | 2.46 | 1700 |

TABLE 2

| Selector Switch Setting | Clamping Current Set Point (amperes) | Force (lbs., REF) |
|---|---|---|
| 0 | 1.88 | 1300 |
| 1 | 2.07 | 1425 |
| 2 | 2.25 | 1550 |
| 3 | 2.43 | 1675 |
| 4 | 2.61 | 1800 |
| 5 | 2.79 | 1925 |
| 6 | 2.97 | 2050 |
| 7 | 3.15 | 2175 |

For the values in Tables 1 and 2, a preferred motor is a ⅛ HP 90 VDC permanent magnet field clamp motor 98 rated at 12 amperes continuous, 52 amperes stall with attached 20:1 worm gear reducer. It is to be understood that the lead screw geometry will affect the relationship of motor current and applied force, and it is within the scope of the present invention to have other ratios of motor current and applied force.

The basic operation of the paint mixer 12 of the present invention is as follows. The controller 180 supplies a regulated current to the clamp motor 98. The clamp motor 98 drives top plate 124 onto one or more paint containers 192. The controller 180 monitors current draw from the motor 98, and determines if contact is made with the paint container 192 by sensing a sudden rise in current draw indicating a sudden load increase on the motor resulting from engagement of the plate 124 with the paint can 192. After plate 124 contacts can 192 the controller 180 continues to provide current to the clamp motor until a desired force is applied by top plate 124 (referred to as "clamping") corresponding to a selected pair of entries in one of Tables 1 and 2. The controller 180 then applies a lower level of current to the motor 98 to maintain the clamping force (through the lead screw assemblies 100, 100') to the paint container(s) 192 through the top plate 124. The controller then powers the mixer motor 64 while the lower level of current is applied to motor 98 to maintain the clamping force throughout the mixing operation. After a selectable, predetermined fixed time elapses, the controller 180 removes power from the mixer motor 64, and retracts the top plate 124 from the paint container(s) 192 after the mixing motion has ceased, to allow an operator to remove the paint container(s) 192 from the mixer 12.

In more detail, operation proceeds as follows. When power is applied, and the system is turned ON, and the door interlock switch is closed, the control will initialize itself and idle for a predetermined time, preferably 5 seconds. The 5 second idle time allows the machine to coast to a stop in the event that power is cycled off and then back on while the main drive motor is in operation.

Determination of Home Position

In the event the top plate is in the START (or "home") position 198 or in another position other than in a "clamped" condition, the controller 180 provides one current pulse to the clamp motor 98 of preferably approximately 200 msec (milliseconds) duration and unlimited current to the clamp motor 98 to cause motion of the top plate 124 in the UP direction.

In the event that the top plate 124 is in the "clamped" condition, the controller 180 provides three current pulses to the clamp motor 98 of preferably approximately 200 msec duration and unlimited current to the clamp motor 98 to cause motion of the top plate 124 in the UP direction.

After the one or three current pulses are applied (as the case may be), the controller 180 then provides 120 VDC to the clamp motor 98 in the UP direction while monitoring current to the clamp motor. When the current in the clamp motor 98 exceeds 1.5 amps for at least 300 msec, the controller will consider that the top plate 124 is in the "home" or START position 198, and will store this status in nonvolatile memory. It is to be understood that the status of the top plate 124 can be one of the following: "home" (or START), CLAMPED, or "other." During initial manufacture, the top plate status is preferably set to "home" in controller 180.

During operation, once the controller 180 determines that the top plate 124 is in the "home" position, the controller 180 enters the IDLE state (as indicated in block 230 of the flow chart 206 of FIG. 9) and thereafter monitors the UP, SHORT CYCLE and LONG CYCLE pushbuttons 60, 56 and 58 (as indicated in block 214 of the flow chart 206).

Mixing Cycle Operation

During the time the controller is monitoring the UP, SHORT CYCLE and LONG CYCLE buttons (i.e., while the controller is in the IDLE state), if either the SHORT CYCLE pushbutton 56 or the LONG CYCLE pushbutton 58 is pushed and the door interlock switch is closed, the following sequence occurs. It is to be understood that the door interlock switch 182 is monitored at all times, and the controller operation in response to activation of switch 182 will be described infra.

Once a short or long cycle is selected by a user depressing one of switches 56 or 58, the indicator lamp 54 is illuminated continuously. The controller provides three current pulses of preferably approximately 200 msec duration each, with current limited to 4.5 amperes based on 120 VAC using open loop phase control to the clamp motor 98, in the DOWN direction, driving the top plate 124 downward using the lead screw assemblies 100 and 100. The controller provides a regulated 90 VDC to the clamp motor 98 to continue to drive the top plate 124 downward. The controller 180 monitors current to the clamp motor during this phase to determine when contact between the top plate 124 and the paint container 192 occurs. When the paint container is contacted, clamp motor current will increase substantially, indicating a clamping condition has occurred. Subsequently, the controller 180 changes the current to the clamp motor 98 to a holding current less than the clamping current level, as has been described supra. Holding current is then maintained while the controller starts and operates the mixer motor 64. Once the predetermined time has elapsed for the cycle selected, the controller stops the mixer motor 64, and the controller idles for preferably approximately 11 seconds to allow the mixer 12 to coast to a stop (during a "coast" cycle), it being understood that holding current is maintained throughout this process.

Unclamping Process

Once the "coast" cycle time has elapsed, clamp motor current is zeroed, and the controller provides three current pulses of preferably approximately 200 msec duration with unlimited current in the UP direction. Thereafter, the controller provides a regulated voltage of 110 VDC to the clamp motor 98 to drive the top plate 124 in the UP direction. Current to the clamp motor 98 is monitored during this phase to determine when a contact between the top plate 124 and the top stop 194 occurs.

If the controller 180 determines that the top plate 124 is in ZONE 1 (the "low" clamp zone) 202, the controller will move the top plate 124 toward the home position 198 a distance of 1.5 inches (±0.5 inches) and then stop movement of the top plate 124. The controller will then enter the IDLE state and wait for user input, by monitoring the pushbuttons according to block 214. Zone 1 and 2 clamping requirements still apply.

If the controller 180 determines that the top plate 124 is not in the low clamp zone 202, the controller moves the top plate 124 toward the home position 198. When the top plate 124 is within 2.0 inches of the home position 198, the controller changes the clamp motor voltage to 85 VDC in the UP direction.

In either case (i.e., the top plate is or is not in the low clamp zone 202) the controller 180 limits the clamp motor current to preferably approximately 2.5 amperes for a predetermined time period of up to preferably approximately 2.5 seconds (with timing beginning immediately after the final pulse). After the predetermined time period (of nominally 2.5 seconds), if the clamp motor current is greater than preferably about 1.5 amperes for at least 300 msec, the controller will consider the top plate 124 to be at the home position 198, and will store this status or state in non-volatile memory. Once the top plate 124 is at the home position 198, the controller zeroes power to the clamp motor 98, turns off the MIXING ON lamp 54, and moves to the IDLE state, monitoring the status of pushbuttons in block 214.

Activation of the UP Button

With one exception, the UP pushbutton 60 will cause the controller 180 to operate as follows, subject to the conditions specified for the interlock switch operation, infra.

If the UP button 60 is depressed while the top plate 124 is in either the home position 198 or moving in the DOWN direction, the controller will activate the MIXING ON lamp 54. The controller 180 provides three current pulses of approximately 200 msec duration each, with unlimited current to the clamp motor 98 in the UP direction. The controller provides a regulated voltage of 85 VDC to the clamp motor to drive the top plate 124 in the UP direction. Current to the clamp motor is monitored during this phase to determine when contact with the top stop 194 occurs. Current is limited to 2.5 amperes for up to 2.5 seconds, with time to begin immediately after the final pulse. After 2.5 seconds if current is greater than 1.5 amperes for at least 300 msec, the controller will consider the top plate 124 to be at the home position 198, and will store this status in non-volatile memory. Once the top plate is at the home position, the controller zeroes power to the clamp motor 98, turns off the MIXING ON lamp 54 and moves to the IDLE state, monitoring the status of the cycle start and UP buttons.

When the top plate is moving in the UP direction, or the system is in a mixing cycle or the COAST cycle, the controller 180 will not respond if the UP pushbutton 60 is activated. The controller 180 will complete any operation it is then executing.

If the UP button 60 is depressed when the mixer motor 64 and clamp motor 98 are both off and a MIXING cycle has been interrupted, the controller 180 will move the top plate 124 toward the top stop 194 for as long as the button 60 is depressed. When the UP button 60 is released, the controller 180 will stop movement of the top plate 124. This operation will occur regardless of the condition of the interlock switch 182. Once the door 18 is closed, and closure is sensed by switch 182, top plate 123 will retract to the home position 198.

Interlock Switch Operation

If at any time the door interlock switch 182 is opened, the controller 180 will switch OFF the mixing motor and the clamp motor 98. It is to be understood that switch 182 is preferably located adjacent door 18 such that door 18 controls the operation of switch 182, with switch 182 closed when door 18 is closed, and switch 182 is open when door 18 is open.

If switch 182 is opened when top plate 124 is moving in the DOWN direction, the controller 180 will stop movement of top plate 124, and when the switch 182 is subsequently closed, the controller 180 will continue the cycle from the point of interruption according to operation of the cycle then in progress. However, if the switch 182 is opened while the controller is powering the mixer motor 64 in the MIXING cycle, the controller will execute the following sequence. The controller will turn off the mixer motor 64, and zero the holding current in the clamping motor 98. The controller 180 will store the time count in non-volatile memory, and monitor the status of switch 182, and the LONG and SHORT cycle buttons 56 and 58 and the UP cycle button 60. If the UP button 60 is depressed, the controller 180 does not respond. If the limit switch 182 is subsequently closed, the controller activates holding current to the clamp motor 98, turns on the mixer motor and continues the time cycle from the value previously stored when the switch 182 was opened.

If the limit switch 182 is activated while the controller is powering the clamp motor 98 in the UP direction, or if the system is in a COAST cycle, the controller will execute the following sequence. If the top plate 124 is in motion, the controller 180 will stop movement. If the interlock switch 182 is subsequently closed, the controller will resume moving the top plate in the UP direction. If the mixer 12 is in a COAST cycle, the controller 180 will continue timing the cycle. Once the cycle time is complete, the controller will not move the top plate until the interlock switch is closed. After switch 182 is closed, the controller will continue the cycle by providing 110 VDC to the clamp motor, followed by the sequence thereafter described in the Unclamping Process section, supra.

The only exception to the above described operation of the switch 182 is during depression of the UP button 60 when power has been restored after interruption of a mixing cycle and there still is no power applied to either of motors 64 and 98.

It is to be understood that references to the "open" and "closed" conditions of the interlock switch 182 may be reversed, if desired, while still remaining within the scope of the present invention. In such a case, the condition of the switch 182 would be opposite to that of door 18, in that switch 182 would be closed when the door is open and vice versa. The controller 180 would then be arranged to accept the opposite switch value corresponding to the door condition from that described above.

Operation in Response to Power Interruptions

In the situation where power is interrupted while the mixer motor 64 is operating and the controller 180 is timing a MIXING cycle, the system will operate as follows. When power is restored, the controller 180 will recall from memory the time count which was saved at power interruption. The controller will continue timing from the recalled value while monitoring the cycle start buttons, with no power applied to the mixer motor 64 unless and until a SHORT or LONG cycle pushbutton 56 or 58 is depressed. Once one of buttons 56 or 58 is depressed, the controller will reestablish power holding current to the clamp motor 98, apply power to mixer motor 64 and continue timing. Whether or not either of buttons 56 or 58 were depressed, when the timer expires, the top plate 124 will retract as described above in the Unclamping Process section.

In situations other than when the mixer motor is operating and the controller is timing a MIXING cycle, the system will operate as follows. When power is reestablished and the interlock switch 182 indicates the door 18 is closed, the controller 180 will move the top plate 124 up to the top stop 194. In the event the switch 182 indicates door 18 is open when power is reestablished, the controller 180 will do nothing until the door 18 is closed, after which the closed door condition will be sensed by switch 182, and the controller will move the top plate 124 to the top stop 194.

As described above, the top plate 124 can be retracted when power is restored after interruption of a mixing cycle.

Control of the Top Plate

Preferably, there is no position feedback included (or required) to control the position of the top plate 124. The controller 180 determines the position of the top plate 124 by monitoring current draw of the clamp motor 98. This is possible because the current draw is much greater when the clamp motor is stalled against either the top stop 194 or one or more paint containers 192, as compared to when the clamp motor is "freewheeling." The term "freewheeling" refers to those portions of cycles where the load on the clamp motor 98 is only from the weight of the top plate 124 and the drag of the lead screw assemblies 100, 100' along with other portions of the clamp motor drive train, when the clamp motor 98 is not stalled. In the practice of the present invention, it has been found that "freewheeling" current averages from about 0.3 amperes to about 1.4 amperes, dependent primarily on lead screw conditions.

During freewheeling portions of cycles, the controller 180 repetitively samples the current draw of the clamp motor 98, and stores the sampled value in memory. If the top plate 124 is being driven in the DOWN direction, and the current to the clamp motor 98 exceeds a predetermined value for over 300 msec, the controller determines that the top plate 124 is in contact with the paint container 192. The predetermined value for the clamp motor current is a value selected to be a level corresponding to a desired clamping level plus free wheeling current draw. Selected levels are listed in Tables 1 and 2, supra.

In one embodiment, the mixer 12 of the present invention applies a higher clamping current in zone 2 (204) than in zone 1 (202). To accomplish this, the controller 180 estimates the location of the top plate 124 in the freewheeling portion of travel in the DOWN direction. The time that the clamp motor 98 is powered, along with the voltage applied to the clamp motor are both monitored, and the travel is estimated based on known rates of travel at incremental motor voltages and times, as determined through testing.

Clamping Forces

Two embodiments of the mixer 12 of the present invention are as follows. One embodiment has a top plate range of travel of preferably about 6.8 inches. In this embodiment, the controller 180 provides clamping current set points as set out in Table 1 for Zone 1.

In a second embodiment of the mixer 12 of the present invention, the range of travel of the top plate 124 is preferably about 14.3 inches. In this embodiment, the controller 180 provides clamping current set points as set out in Table 2 for Zone 2.

For both embodiments, each of the current set points is the sum of a tabulated value of current determined empirically and a stored free wheeling current value. Tolerance for clamping currents are preferably about +2.5% of actual value throughout the specified voltage range. As stated above, the first 0.75 inches of top plate travel is the Proof of Movement zone, and clamping requirements are exempt within this range. In the event that the top plate 124 encounters an obstruction in the Proof of Movement zone, the controller 180 will limit clamp motor current to 2.5 amperes and will cause the system to react as if the UP pushbutton had been depressed.

In a preferred form of at least the second embodiment, two eight position switches are provided in controller 180 to allow a user to select one of the clamping current set points and hence the force applied by the top plate 124 when clamping a paint container against the bottom plate 94. Having two switches allows independent settings for each of Zone 1 (202) and Zone 2 (204). It is to be understood that software values corresponding to each position are preferably modifiable via programming changes.

Noise Filtering of Clamping Motor Current

Controller 180 preferably uses averaging to filter out electrical noise while monitoring clamp motor current. Each time the controller 180 checks clamping motor current, preferably a minimum of eight readings are taken, and the average of these eight readings are retained as the value for clamping motor current. The sample rate for the eight readings is preferably 120 samples per second, with the samples synchronized with a sine wave zero crossing of the input power at cord or mains 172.

Holding Current

To prevent the clamping forces from relaxing during operation, the controller 180 provides a holding current to the clamp motor 98 while the mixer motor 64 is operating, and also during COAST cycles. The holding current is preferably about 0.3 amperes ±0.1 ampere. Holding current is zeroed if and when the interlock switch 182 indicates the door 18 is open. Once switch 182 indicates the door 18 has been reclosed, the controller 180 reestablishes holding current to the clamp motor 98.

Visual Status Indicators

The mixer 12 of the present invention may optionally have a plurality of visual indicators, preferably in the form of light emitting diodes, or "LED's" respectively illuminated to indicate the following conditions.

1. Home position—top plate 124 is in the home or START position 198.
2. Proof-of-Movement zone—top plate is in zone 200.
3. Down—Zone 2—top plate 124 is moving down in zone 204.
4. Down—Zone 1—top plate 124 is moving down in zone 202.
5. Holding—controller 180 is providing holding current to clamp motor 98.
6. Mixing—mixer motor 64 is operating.
7. Coast—controller 180 is in the COAST cycle.
8. UP—top plate 124 is moving in the UP direction.

System Overview

It can thus be seen that the present invention includes a method of selecting one of a plurality of predetermined forces for a clamping mechanism to apply to a paint container in a paint mixing machine without using a force measuring sensor and without using a distance measuring sensor. In one aspect, the method includes determining a home position 198 for the movable plate 124 by directing the movable plate to an end of travel position and monitoring for a current rise in the clamp motor 98 when the movable plate reaches an obstruction at the end of travel position, monitoring a voltage applied to and a current conducted through the clamp motor, determining when a rise in current occurs and calculating the distance the clamping mechanism 124 has traveled based on the voltage and time of energization of the clamp motor, and selecting a clamping current corresponding to one of a plurality of clamping forces (according to Table 1 or 2, or both), based on the distance the clamping mechanism has traveled until the current rise. The distance traveled is to be understood to be the distance from the home position 198 to a clamping position or condition engaging the paint container 192 in the clamping mechanism of the paint mixing machine. In determining the home position for the movable plate, the system applies a predetermined voltage, preferably 85 volts, to the clamp motor to cause movement of the movable plate in an upward direction and monitors the current until a predetermined clamp motor current, preferably about 1.5 amperes, is exceeded for about 300 milliseconds. The method can also include applying a current pulse, preferably of a duration of about 200 milliseconds and an amplitude of about 4.5 amperes (based on about 120 volts AC using open loop phase control), to the clamp motor to cause movement of the movable plate in the upward direction before applying the predetermined voltage.

When the movable plate is in a clamping condition, the method can also include determining a home position for the movable plate by applying a plurality of current pulses (of about 200 milliseconds duration with unlimited current) to the clamp motor to cause movement in the upward direction, followed by applying a voltage to the clamp motor to cause movement of the movable plate in the upward direction and monitoring current until the clamp motor current exceeds 1.5 amperes for about 300 milliseconds. The method can also include allowing the clamp motor to draw up to 2.5 amperes for up to 2.5 seconds from the time power is initially applied to the clamp motor. It may thus be seen that the distance traveled by the movable plate 124 is determined by monitoring the voltage applied to the clamp motor and the time the voltage is applied. This method uses voltage applied to an armature (not shown) of the clamp motor 98 of the type having a separately powered field, preferably a permanent magnet field (not shown). It is to be understood that it is preferable that the voltage applied to the motor is provided by a closed loop phase control.

Electrical Schematic

Figure 10:
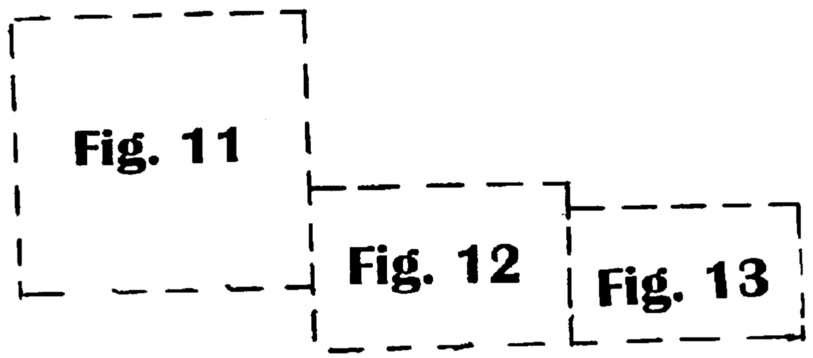
FIG. 10 is a key for FIGS. 11, 12 and 13.
Figure 14:
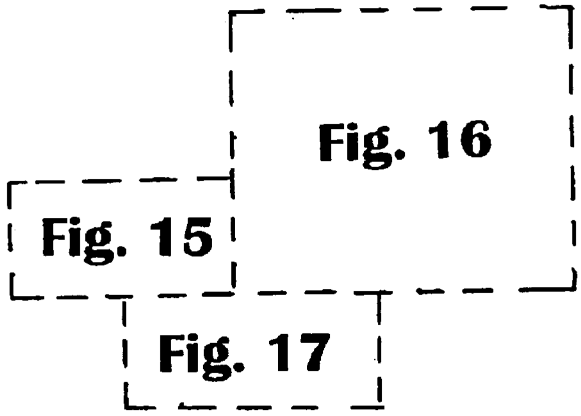
FIG. 14 is a key for FIGS. 15, 16 and 17.
Figure 11:
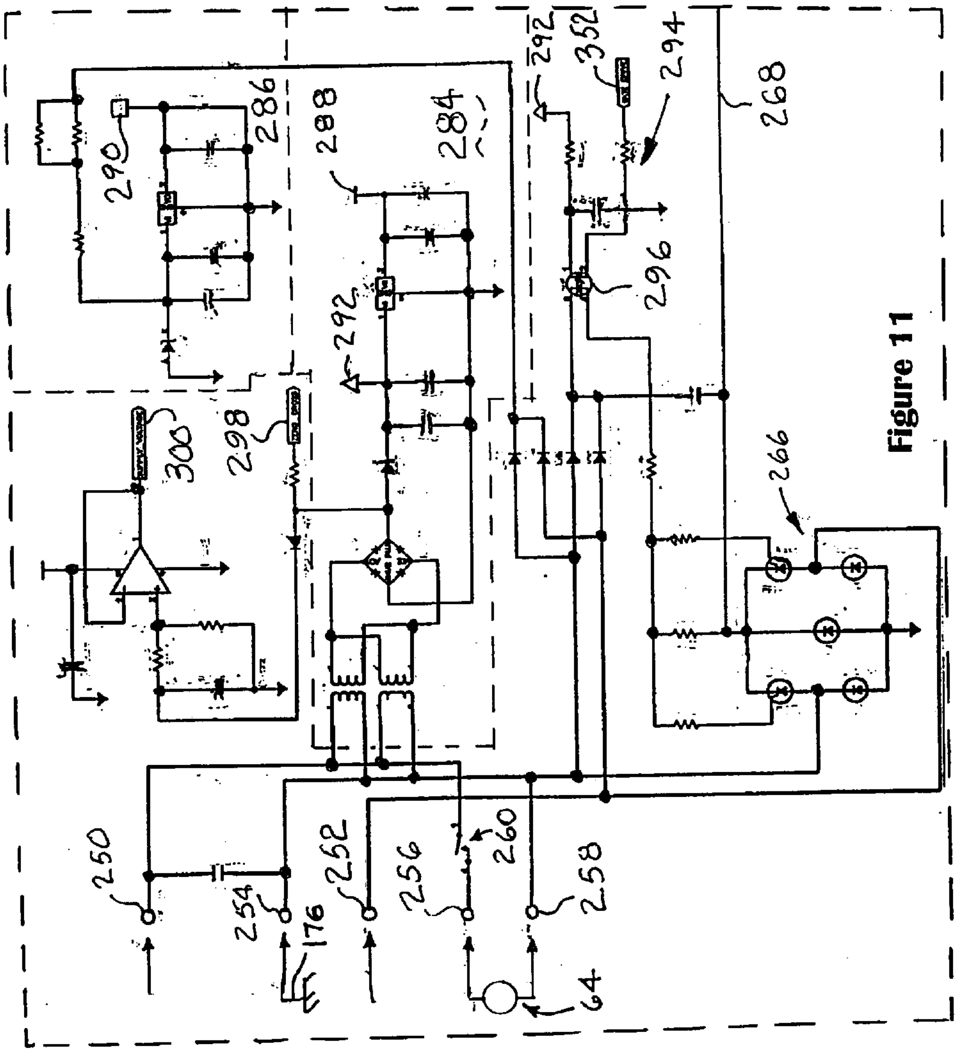
FIG. 11 is a detailed electrical schematic of power control portions of the control system of the present invention.
Figure 12:
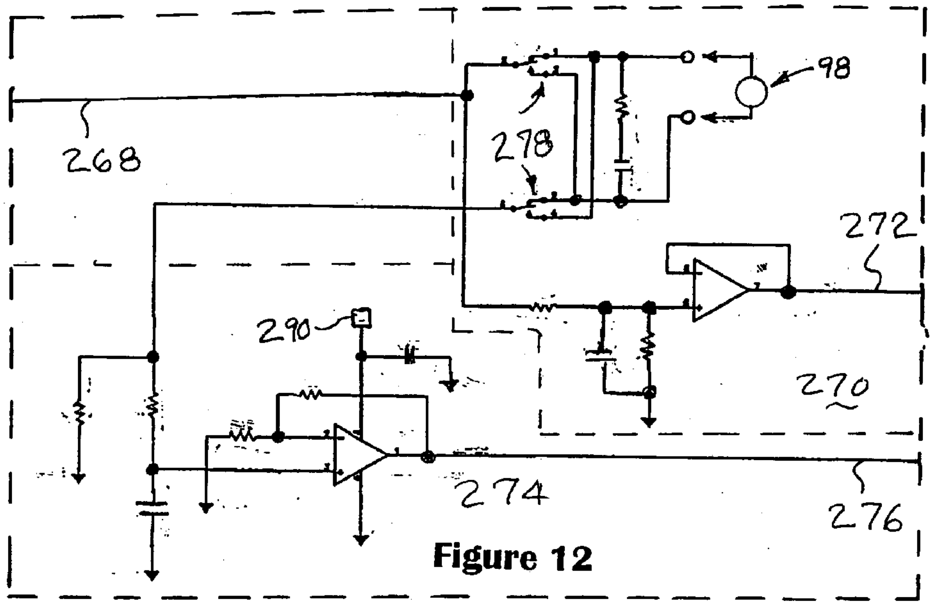
FIG. 12 is detailed electrical schematic of a portion of the control system of the present invention which includes circuits to provide signals representative of clamp motor voltage and current.
Figure 13:
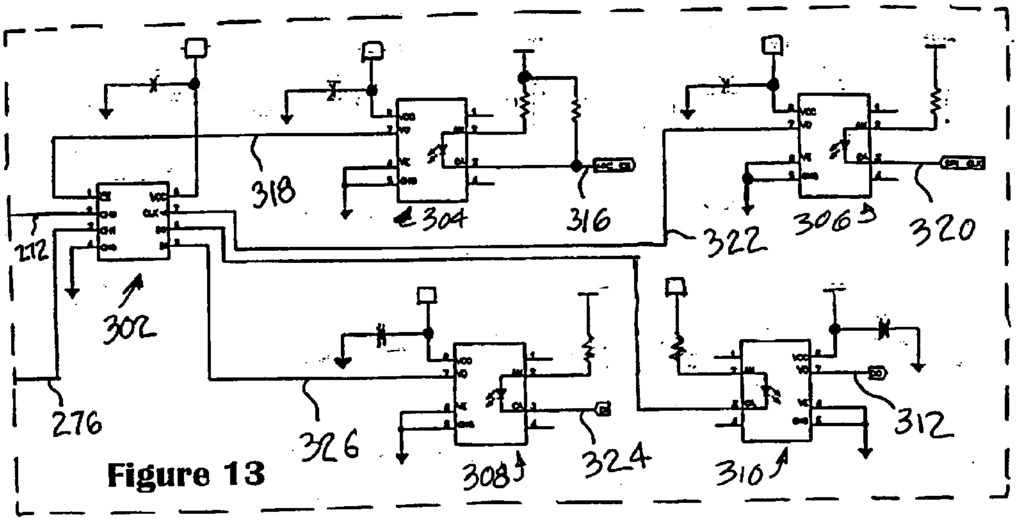
FIG. 13 is a detailed electrical schematic of a portion of the control system of the present invention showing an analog to digital converter and related opto-isolators.
Figure 18:
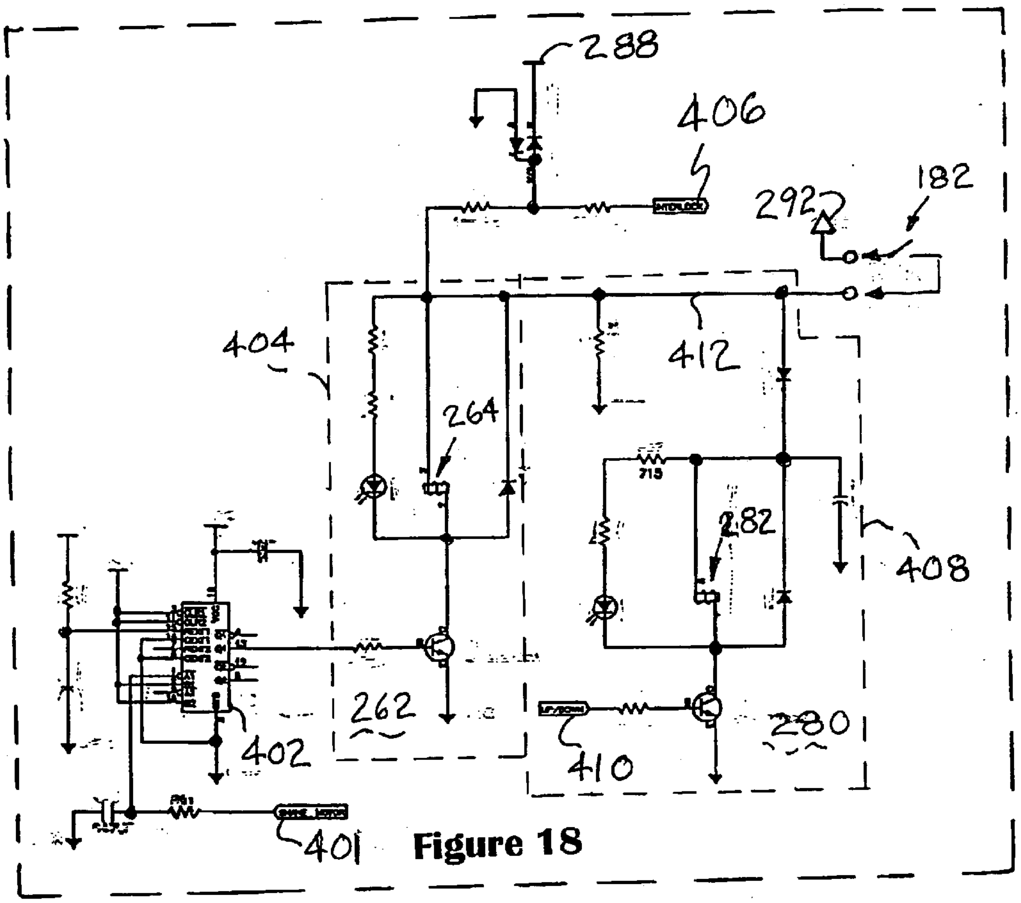
FIG. 18 is a detailed electrical schematic of a portion of the control system of the present invention showing a monostable multivibrator and relay driver circuits.

FIG. 10 is a key for a part of the electrical schematic made up of FIGS. 11, 12, and 13. FIG. 11 is a detailed electrical schematic of power control portions of the controller 180 of the present invention. Terminal 250 receives AC input power, preferably 120 VAC, 60 Hz. Terminal 252 also receives AC input power, through a fuse (not shown). Terminal 254 is a neutral connection. Terminals 256 and 258 are connected to mixer motor 64, and power motor 64 when contact 260 is closed. Contact 260 is controlled by a relay coil 264 in a mixer motor driver circuit 262 (see FIG. 18). Power is also provided from terminals 250 and 252 to an SCR-diode bridge 266 which is used to provide controllable power to the clamp motor via line 268. Referring now also to FIG. 12, a detailed electrical schematic of a portion of the controller 180 may be seen to include a clamp motor voltage circuit 270 which provides a signal on line 272 representative of clamp motor voltage and a clamp motor current circuit 274 which provides a signal on line 276 representative of clamp motor current. Relay contacts 278 are controlled by a relay coil 282 in a clamp motor direction driver circuit 280 (see FIG. 18). Referring again to FIG. 11, an isolated DC power supply circuit 284 and a non-isolated DC power supply circuit 286 provide (preferably)+5 VDC to respective parts of the controller 180 that are isolated and not isolated from the input power on lines 250 and 252. Isolated DC power is indicated by a bar 288, while non-isolated DC power is indicated by a box 290. Isolated but unregulated DC power is indicated by an open triangle 292, used by a gate drive circuit 294 and the relay driver circuits 262 and 280 (FIG. 18). Gate drive signals for bridge 266 are isolated by an opto-isolator 296. A ZERO CROSSING signal is available at node 298, and a signal representative of the supply voltage is available at node 300.

Referring now also to FIG. 13, an analog to digital converter 302 and related opto-isolators 304, 306, 308, and 310 may be seen. Converter 302 is preferably a model ADC8832 serial 8 bit converter available from National Semiconductor. The opto-isolators are preferably a model TLP2200, available from Toshiba. It is to be understood that converter 302 multiplexes both the voltage and current signals (on lines 272 and 276, respectively) from the clamp motor 98, and delivers isolated, multiplexed digital versions of each at line 312, which is connected to a microcontroller 314 shown in FIG. 16. Isolator 304 receives a CHIP SELECT command on line 316 from microcontroller 314 and delivers the CHIP SELECT command to converter 302 on line 318, connected to pin 1 of converter 302. Isolator 306 receives a CLOCK signal on line 320 from microcontroller 314 delivers an isolated CLOCK signal on line 322 to pin 7 of converter 302. Isolator 308 receives a DATA IN serial data on line 324 from microcontroller 314 and delivers an isolated DATA IN signal on line 326 to pin 5 of converter 302. The DATA IN signal determines whether it is the clamp motor voltage or current that is to be converted from analog to digital format, by controlling which of the two channels of converter 302 are to be used for the next conversion.

Figure 17:
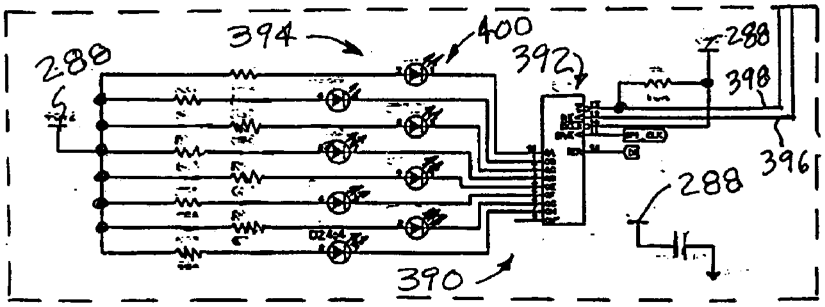
FIG. 17 is a detailed electrical schematic of a portion of the control system of the present invention showing a shift register and associated optical indicator circuits.
Figure 15:
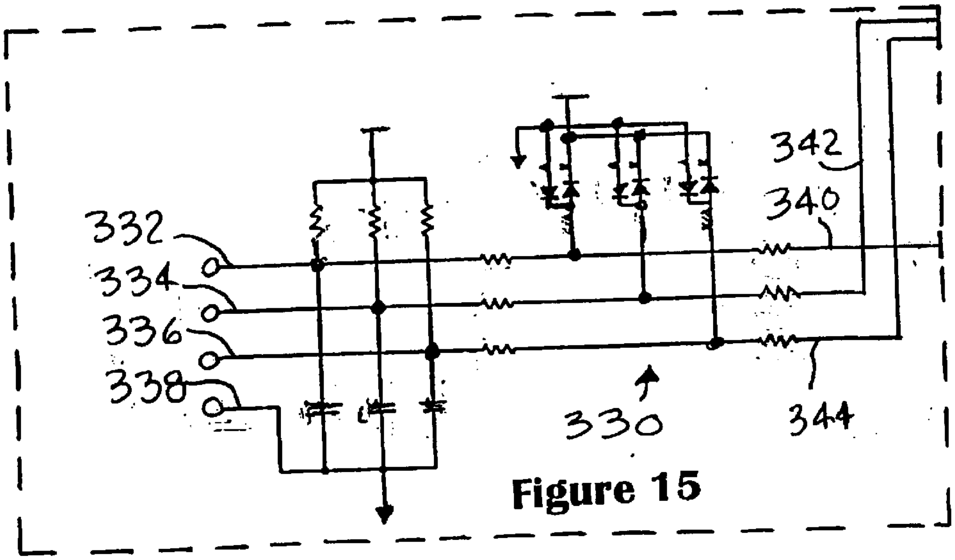
FIG. 15 is a detailed electrical schematic of a portion of the control system of the present invention showing switch interface circuits.
Figure 16:
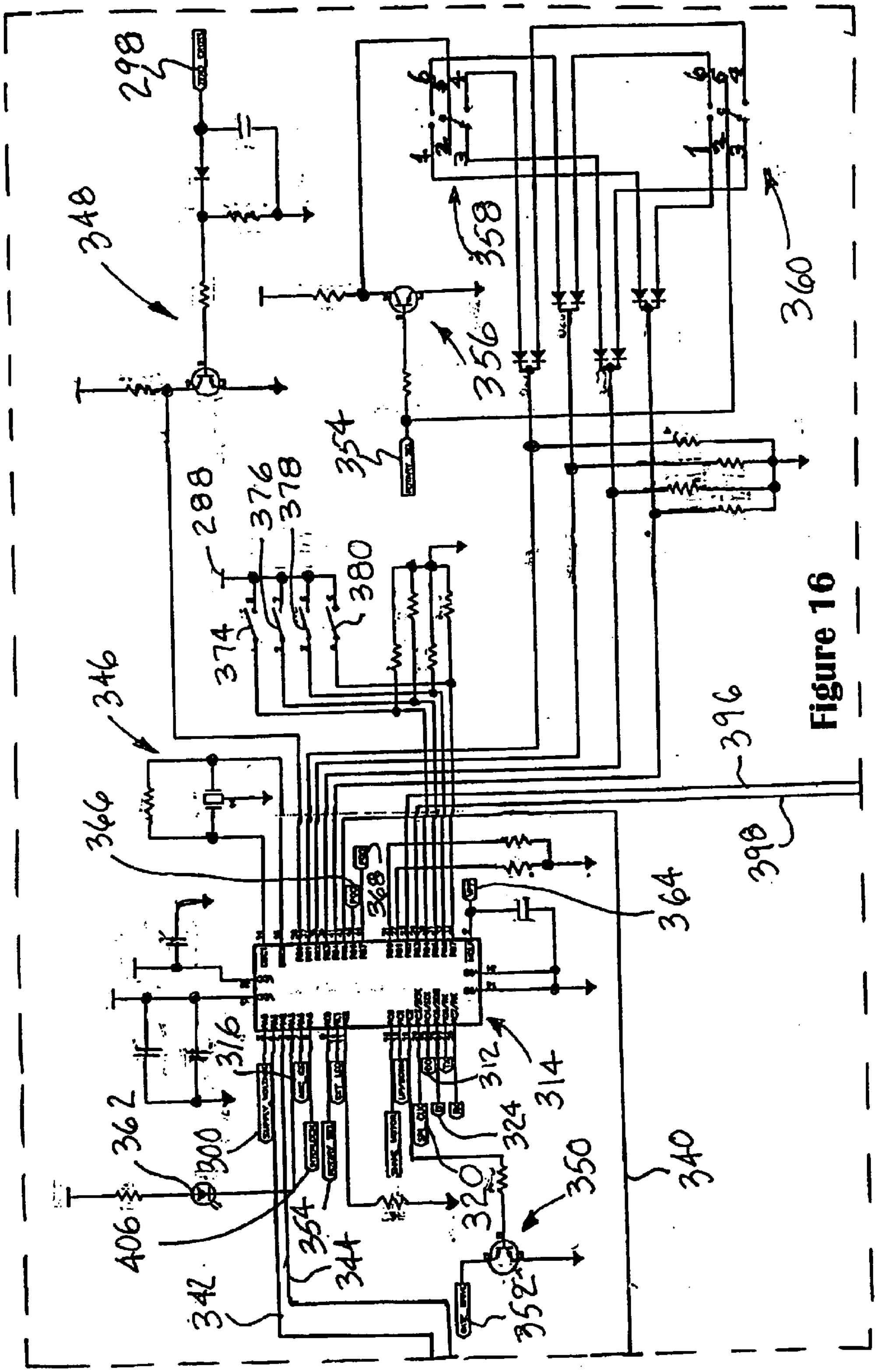
FIG. 16 is a detailed electrical schematic of a portion of the control system of the present invention showing a microcontroller and certain associated circuits.

Referring now to FIGS. 15, 16, and 17, further details of the controller 180 of the present invention may be seen. FIG. 15 shows details of a switch interface circuit 330. Circuit 330 provides for connection between the microcontroller 314 (in FIG. 16) and the SHORT CYCLE, LONG CYCLE and UP pushbutton switches 56, 58, and 60. As may also be seen in FIG. 7, line 332 connects to the SHORT CYCLE button 56; line 334 connects to the LONG CYCLE button 58; line 336 connects to the UP button 60; and line 338 connects to a circuit common connection among these switches. Referring now also to FIG. 16, line 340 is connected to pin 42 of microcontroller 314 to provide a SHORT CYCLE command. Line 342 is connected to pin 4 of microcontroller 314 to provide a LONG CYCLE command. Line 344 is connected to pin 5 of microcontroller 314 to provide An UP command.

Figure 19:
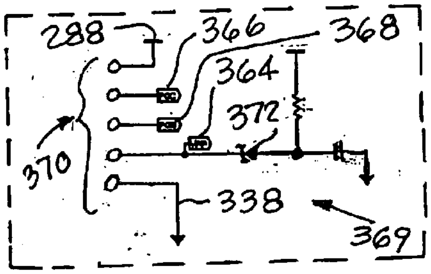
FIG. 19 is a detailed electrical schematic of a portion of the control system of the present invention showing a programming port and associated circuitry.

Referring now most particularly to FIG. 16, that portion of the control system of the present invention including microcontroller 314 and certain associated circuits may be seen. Microcontroller 314 is preferably a type PIC16F877/L PLCC 44 pin device available from Microchip Technology Inc. at 2355 West Chandler Blvd., Chandler, Ariz. 85224-6199. Pin 3 of microcontroller 314 is connected to the SUPPLY VOLTAGE node 300. Pin 7 of microcontroller 314 is connected to the CHIP SELECT line 316. Pin 20 of microcontroller 314 is connected to the CLOCK line 320. Pin 25 of microcontroller 314 is connected to the DATA OUT line 312. Pin 26 of microcontroller 314 is connected to the DATA IN line 324. Pins 12 and 35 of microcontroller 314 are connected to the isolated power supply line indicated by bar 288. Pins 13 and 34 of microcontroller 314 are connected to circuit common 338. Pins 14 and 15 are connected across a 4.00 MHz crystal oscillator circuit 346. Pins 11, 21 and 22 are each connected through a 10K ohm resistor to circuit common 338. Pin 36 is connected to a wave shaping circuit 348 which, in turn is connected to the ZERO CROSSING node 298. Circuit 348 filters and squares up the signal representative of the zero crossing of the AC input power and is used by the microcontroller 314 to provide gate pulses on pin 19 for phase control of the bridge 266 driving the clamp motor 98. The gate pulses are amplified by a gate drive circuit 350 and delivered to a GATE DRIVE node 352, also shown in FIG. 11. Pin 9 of microcontroller 314 is connected to a ROTARY SELECTOR node 354, which also is connected to a rotary selector switch driver circuit 356, which alternately powers one of two rotary selector switches 358, 360, depending upon the binary state of the signal at the ROTARY SELECTOR node 354. Pins 37, 38, 39, and 41 of the microcontroller 314 receive the outputs of the switch 358 or 360 (depending upon which switch is powered, corresponding to the signal at node 354) to provide the clamping current set points for the two zones, as indicated supra in Tables 1 and 2. Pin 6 of microcontroller 314 drives an LED indicator 362, which provides a "heartbeat" indication to show processor activity. Pin 2 of microcontroller 314 is connected to a VPP node 364, which also appears in FIG. 19. Similarly pins 43 and 44 of microcontroller 314 are respectively connected to a PGC node 366, and a PGD node 368, which also appear in FIG. 19. FIG. 19 shows a programming port circuit 369 having terminals 370 for connection to a programmer (not shown) for programming microcontroller 314. Circuit 369 has a Schottky type diode 372 to isolate programming voltage from Vcc 288. Switch 374 is connected to pin 30 of microcontroller 314 to enable selection of one of two predetermined cycle times, as described above. Switch 376 is connected to pin 31 of microcontroller 314 to set the controller 180 for one or two zone operation. Switches 378 and 380 are auxiliary switches. When switch 378 is in the ON position, a user is allowed to abort a cycle and unclamp. When switch 378 is in the OFF position, it prevents a user from unclamping until the time has expired. Switch 380 is used for testing and burn in.

Referring now most particularly to FIG. 17, a condition or status indication circuit 390 having a shift register 392 and associated optical indicator circuits 394 may be seen. Shift register 392 is preferably a model 74HC595D eight bit, serial in, serial or parallel out latch type integrated circuit. Pin 23 of microcontroller 314 provides a LATCH RCLK signal on line 396 and a LATCH CS signal from pin 24 on line 398 to circuit 390. In operation, circuit 390 will illuminate one of eight LED's 400 to indicate the system status as described above in the Visual Status Indicators section. LATCH CS serves as an output enable signal, allowing the data in the latch to be present at the outputs of the latch driving the optical indicator circuits 394. LATCH RCLK is the latch clock. A low-to-high transition on line 396 moves data from the latch to the outputs connected to the optical indicator circuits 394.

Referring now to FIG. 18, a detailed electrical schematic of a portion of the control system of the present invention showing a monostable multivibrator and relay driver circuits may be seen. In this portion of the control system, a mixer motor command input is received on terminal 401, which is connected to pin 16 of microcontroller 314. The signal on terminal 401 is connected to a trigger input on a 74HC123 type integrated circuit one-shot 402 (monostable multivibrator) which powers a mixer motor relay circuit 404 containing mixer motor relay coil 264. The circuit 404 also provides an output on an interlock status signal terminal 406 to pin 8 of the microcontroller 314. The signal on line 412 also communicates the status of limit switch 182 to microcontroller 314 via terminal 406. The relay coil 264 is energized only when the mixer motor command indicates that mixing is to commence and the door 18 is closed, indicated by a closed condition in switch 182. One-shot 402 provides a "watch dog" timer function for the mixer motor 64. If the microcontroller 314 "locks up" the mixer motor will stop. The one-shot 402 is periodically refreshed by the microcontroller 314. In the event the one-shot is not refreshed, it will time out and disable the mixer motor 64 by shutting down relay 264.

A clamp motor direction driver circuit 408 receives an UP/DOWN command on terminal 410 which is connected to pin 18 of microcontroller 314. Circuit 408 controls relay coil 282 to determine the direction of rotation of clamp motor 98 and hence the direction of travel of top plate 124 by controlling the condition of relay contacts 278 (FIG. 12). When limit switch 182 is open (indicating the door 18 is open) neither of relay coils 264 or 282 will receive sufficient power for energization. When limit switch 182 is closed, the unregulated DC power indicated by symbol 292 is applied to line 412, providing energization power for relay coils 264 and 282, which are then respectively controlled by the signals on terminals 401 and 410.

Figure 20:
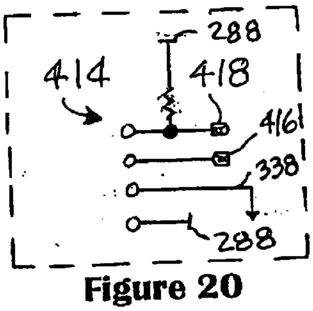
FIG. 20 is a detailed electrical schematic of a portion of the control system of the present invention showing a communication port and associated circuitry.

Referring now to FIG. 20, a communication port 414 is provided for serial communication with the microcontroller 314, and includes a transmit terminal 416 connected to pin 27 of microcontroller 314 and a receive terminal 418 connected to pin 29 of microcontroller 314.

Figure 21:
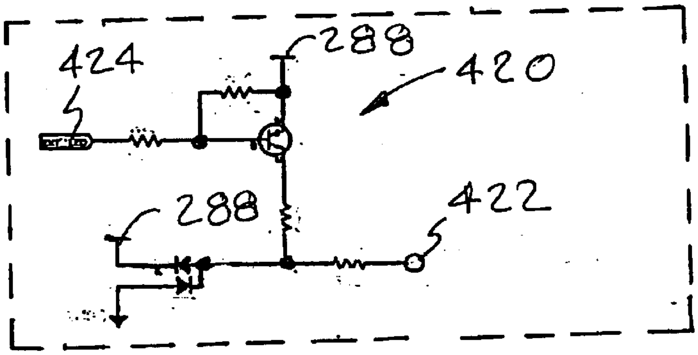
FIG. 21 is a detailed electrical schematic of a portion of the control system of the present invention showing an optical indicator driver circuit.

FIG. 21 shows an optical indicator driver circuit 420 for powering the indicator lamp 54 (FIGS. 2 and 7), which is preferably an LED connected to output terminal 422 when commanded to do so via an indicator command input on terminal 424, connected to pin 10 of microcontroller 314.

From the above, it may be seen that an apparatus for carrying out the present invention automatically applies one of a plurality of clamping forces via a clamping mechanism to a paint container in a paint mixing machine, without a force measuring sensor and without a distance measuring sensor. The apparatus preferably includes voltage monitoring means for monitoring a clamp motor voltage applied to the clamp motor; current monitoring means for monitoring a clamp motor current conducted through the clamp motor, clamp detecting means for determining when a rise in clamp motor current occurs and for calculating the distance the clamping mechanism has traveled until the rise in clamp motor current occurs, based on the clamp motor voltage and a time it is applied, and clamp force selection means for selecting a clamping current corresponding to one of a plurality of clamping forces based on the distance traveled by the clamping mechanism until clamping is detected by the clamp detecting means. The plurality of clamping forces are preferably a pair of clamping forces and the apparatus may include a pair of selector switches to select a pair of clamping forces for the plurality of clamping forces from among a set of clamping forces corresponding to a set of clamp motor currents. The clamping force selection means preferably selects from a high clamping force and a low clamping force, with the high clamping force corresponding to a high clamping zone, and with a low clamping force selected corresponding to a low clamping zone, the clamp force selection means selecting a high clamping current when the clamping mechanism is in the high clamping zone, and a low clamping current when the clamping mechanism is in the low clamping zone.

This invention is not to be taken as limited to all of the details thereof as modifications and variations thereof may be made without departing from the spirit or scope of the invention.

What is claimed is:

1. A method of selecting one of a plurality of predetermined forces for a clamping mechanism to apply to a paint container in a paint mixing machine without using a force measuring sensor and without using a distance measuring sensor, the method comprising:

a. monitoring a voltage applied to and a current conducted through a clamp motor;

b. determining when a rise in current occurs and calculating the distance the clamping mechanism has traveled based on the voltage and time of energization of the clamp motor; and c. selecting a clamping current corresponding to one of a plurality of clamping forces, based on the distance the clamping mechanism has traveled until the current rise.

2. The method of claim 1 wherein the clamping mechanism has a movable plate driven by the clamp motor and the method further includes an additional step before step a of:

a0. determining a home position for the movable plate by directing the movable plate to an end of travel position and monitoring for a current rise in the clamp motor when the movable plate reaches an obstruction at the end of travel position.

3. The method of claim 2 wherein the distance traveled in step b is the distance from the home position to a clamping position engaging a paint container in the clamping mechanism of the paint mixing machine.

4. The method of claim 2 wherein step a0. further comprises determining a home position for the movable plate by applying a predetermined voltage to the clamp motor to cause movement of the movable plate in an upward direction and monitoring current until a predetermined clamp motor current is exceeded for about 300 milliseconds.

5. The method of claim 4 wherein the predetermined voltage is about 85 volts.

6. The method of claim 4 wherein the predetermined clamp motor current is about 1.5 amperes.

7. The method of claim 4 wherein step a0. further comprises applying a current pulse to the clamp motor to cause movement of the movable plate in the upward direction before applying the predetermined voltage.

8. The method of claim 7 wherein the current pulse is about 200 milliseconds duration.

9. The method of claim 7 wherein the current pulse is about 4.5 amperes based on about 120 volts AC using open loop phase control for the electrical power applied to the clamp motor.

10. The method of claim 2 wherein, when the movable plate is in a clamp ing condition, step a0. further comprises determining a home position for the movable plate by applying a plurality of current pulses to the clamp motor to cause movement in the upward direction, followed by applying a predetermined voltage to the clamp motor to cause movement of the movable plate in the upward direction and monitoring current until a predetermined clamp motor current is exceeded for about 300 milliseconds.

11. The method of claim 10 wherein each of the plurality of current pulses a re about 200 milliseconds duration.

12. The method of claim 11 wherein each of the plurality of current pulses are about 4.5 amperes based on about 120 volts AC using open loop phase control for the electrical power applied to the clamp motor.

13. The method of claim 10 wherein the predetermined clamp motor current is a first predetermined clamp motor current and the clamp motor is allowed to draw current up to a second predetermined clamp motor current greater than the first predetermined clamp motor current for up to a predetermined time interval from the time power is initially applied to the clamp motor.

14. The method of claim 13 wherein the second predetermined clamp motor current is about 2.5 amperes.

15. The method of claim 13 wherein the predetermined time interval is about 2.5 seconds.

16. The method of claim 1 wherein the distance traveled by the movable plate is determined by monitoring the voltage applied to the clamp motor and the time the voltage is applied.

17. The method of claim 16 wherein the voltage applied to the clamp motor is applied to an armature with a separately powered field.

18. The method of claim 17 wherein the separately powered field is a permanent magnet field.

19. The method of claim 17 wherein the voltage applied to the motor is provided by a closed loop phase control.

20. Apparatus for automatically applying one of a plurality of clamping forces via a clamping mechanism to a paint container in a paint mixing machine, without a force measuring sensor and without a distance measuring sensor, the apparatus comprising:

a. voltage monitoring means for monitoring a clam p motor voltage applied to a clamp motor;

b. current monitoring means for monitoring a clamp motor current conducted through the clamp motor;

c. clamp detecting means for determining when a rise in clamp motor current occurs and for calculating the distance the clamping mechanism has traveled until the rise in clamp motor current occurs, based on the clamp motor voltage aid a time it is applied; and d. clamp force selection means for selecting a clamping current corresponding to one of a plurality of clamping forces based on the distance traveled by the clamping mechanism until clamping is detected by the clamp detecting means.

21. The apparatus of claim 20 wherein the plurality of clamping forces comprise a pair of clamping forces and wherein the apparatus further comprises e. a pair of selector switches to select a pair of clamping forces for the plurality of clamping forces from among a set of clamping forces corresponding to a set of clamp motor currents.

22. The apparatus of claim 20 wherein the clamping force selection means selects from a high clamping force and a low clamping force, with the high clamping force corresponding to a high clamping zone, and with a low clamping force selected correspond ing to a low clamping zone, the clamp force selection means selecting:

i. a high clamping current when the clamping mechanism is in the high clamping zone, and ii. a low clamp ing current when the clamping mechanism is in the low clamping zone.

* * * * *

UNITED STATES PATENT AND TRADEMARK OFFICE

CERTIFICATE OF CORRECTION

PATENT NO. : 6,850,020 B1
DATED : February 1, 2005
INVENTOR(S) : Thomas J. Midas et al.

It is certified that error appears in the above-identified patent and that said Letters Patent is hereby corrected as shown below:

Column 16,
Line 6, delete “clamp ing” and insert “clamping”
Line 14, delete “a re” and insert “are”
Line 46, delete “clam p” and insert “clamp”
Line 54, delete “aid” and insert “and”

Signed and Sealed this

Twenty-sixth Day of April, 2005

JON W. DUDAS
*Director of the United States Patent and Trademark Office*